United States Patent
Pehlke et al.

(10) Patent No.: US 7,023,292 B2
(45) Date of Patent: Apr. 4, 2006

(54) POLAR MODULATION USING AMPLITUDE MODULATED QUADRATURE SIGNALS

(75) Inventors: David R. Pehlke, Chapel Hill, NC (US); Aristotele Hadjichristos, Apex, NC (US)

(73) Assignee: Telefonaktiebolaget L.M. Dericsson, Stockholm (SE)

( * ) Notice: Subject to any disclaimer, the term of this patent is extended or adjusted under 35 U.S.C. 154(b) by 146 days.

(21) Appl. No.: 10/738,268

(22) Filed: Dec. 17, 2003

(65) Prior Publication Data
US 2005/0134396 A1    Jun. 23, 2005

(51) Int. Cl.
- H03C 1/00 (2006.01)
- H03C 3/00 (2006.01)
- H03C 5/00 (2006.01)

(52) U.S. Cl. ............ 332/151; 332/144; 332/145; 332/146; 332/149; 332/152; 332/163; 332/164; 332/178

(58) Field of Classification Search ........ 332/144–146, 332/149, 151–152, 163–164, 178; 330/10
See application file for complete search history.

(56) References Cited

U.S. PATENT DOCUMENTS

| | | | | |
|---|---|---|---|---|
| 4,549,152 A | 10/1985 | Kumar | | 332/144 |
| 4,751,478 A * | 6/1988 | Yoshida | | 332/104 |
| 4,804,931 A | 2/1989 | Hulick | | 332/163 |
| 4,862,116 A | 8/1989 | Olver | | 332/145 |
| 4,870,374 A | 9/1989 | Harris | | 332/145 |
| 5,317,288 A | 5/1994 | Yung et al. | | 332/144 |
| 5,974,041 A | 10/1999 | Kornfeld et al. | | 370/342 |
| 6,133,788 A | 10/2000 | Dent | | 330/124 |
| 6,472,934 B1 | 10/2002 | Pehlke | | 330/10 |
| 6,531,935 B1 | 3/2003 | Russat et al. | | 333/139 |
| 2002/0077066 A1 | 6/2002 | Pehlke et al. | | 455/73 |
| 2002/0094791 A1 | 7/2002 | Pehlke et al. | | 455/115 |
| 2002/0136325 A1 | 9/2002 | Pehlke et al. | | 375/300 |
| 2002/0137480 A1 | 9/2002 | Hadjichristos et al. | | 455/127 |
| 2002/0180533 A1 | 12/2002 | Pehlke et al. | | 330/296 |
| 2002/0183019 A1 | 12/2002 | Dent et al. | | 455/108 |

* cited by examiner

Primary Examiner—David Mis
(74) Attorney, Agent, or Firm—Myers Bigel Sibley & Sajovec, PA (57) ABSTRACT

Polar modulators include a phase splitter, a controller, variable current sources, transistor circuits, and a combiner. The phase splitter splits a RF carrier signal into quadrature component signals that are 90 degrees out of phase with each other. The controller generates modulation control signals based on information that is to be transmitted. The variable current sources each generate a variable amplitude current signal based on a different one of the modulation control signals. Each of the transistor circuits amplify a different one of the quadrature component signals with a variable amplification based on the variable amplitude current signal from a different one of the variable current sources to generate an amplitude adjusted quadrature component signal. The combiner combines the amplitude adjusted quadrature component signals from each of the transistor circuits to generate a phase-modulated RF carrier output signal.

22 Claims, 5 Drawing Sheets

POLAR MODULATION USING AMPLITUDE MODULATED QUADRATURE SIGNALS

BACKGROUND OF THE INVENTION

The present invention relates to wireless communication devices that use polar modulation to transmit information.

Some wireless communication devices communicate by modulating the polar components (e.g., amplitude and phase) of a radio carrier. For example, a phase modulation signal and an amplitude modulation signal may be generated at a baseband frequency. The phase modulation signal may then be used to modulate the phase of an RF carrier that has a constant envelope amplitude. The phase modulated RF carrier may then be passed through a power amplifier whose supply voltage is modulated by the amplitude modulation signal to generate the envelope of a desired output signal.

Unexpected delay between the phase modulation signal and the amplitude modulation signal may cause the signals to be applied to different portions of the RF carrier, and may result in undesirable distortion of the output signal. Moreover, the amplitude modulation may cause inadvertent phase modulation due to undesired feedback between phase modulation components and amplitude modulation components.

BRIEF SUMMARY OF THE INVENTION

In some embodiments of the present invention, a polar modulator includes a phase splitter, a controller, variable current sources, transistor circuits, and a combiner. The phase splitter splits a RF carrier signal into quadrature component signals that are 90 degrees out of phase with each other. The controller generates modulation control signals based on information that is to be transmitted. The variable current sources each generate a variable amplitude current signal based on a different one of the modulation control signals. Each of the transistor circuits amplify a different one of the quadrature component signals with a variable amplification based on the variable amplitude current signal from a different one of the variable current sources to generate an amplitude adjusted quadrature component signal. The combiner combines the amplitude adjusted quadrature component signals from each of the transistor circuits to generate a phase-modulated RF carrier output signal.

In some further embodiments of the present invention, the controller generates four modulation control signals. Four variable current sources each generate a variable amplitude current signal based on a different one of the four modulation control signals. Four transistor circuits each amplify a different one of the quadrature component signals with a variable amplification based on the variable amplitude current signal from a different one of the four variable current sources to generate the amplitude adjusted quadrature component signals.

In some other embodiments of the present invention, a polar modulator includes a phase splitter, a controller, four power amplifiers, and a combiner. The phase splitter splits a RF carrier signal into quadrature component signals that are 90 degrees out of phase with each other. The controller generates four modulation control signals based on information that is to be transmitted. Each of the four power amplifiers amplify a different one of the quadrature component signals with a variable amplification based on the four modulation control signals to generate an amplitude adjusted quadrature component signal. The combiner includes four quarter wave transmission lines that are each configured to couple a different one of the amplitude adjusted quadrature component signals to a common output load, and to generate a phase-modulated RF carrier output signal.

The polar modulator may further include a shunt resonant circuit that is connected to the common output load, and that attenuates harmonic currents in the quarter wave transmission lines.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless transmitters according to embodiments of the invention. It is understood that each block of the block diagrams and/or operational illustrations, and combinations of blocks in the block diagrams and/or operational illustrations, can be implemented by radio frequency, analog and/or digital hardware, and/or computer program operations. These computer program instructions may be provided to a processor of a general purpose computer, special purpose computer, ASIC, and/or other programmable data processing apparatus in a wireless terminal or base station, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
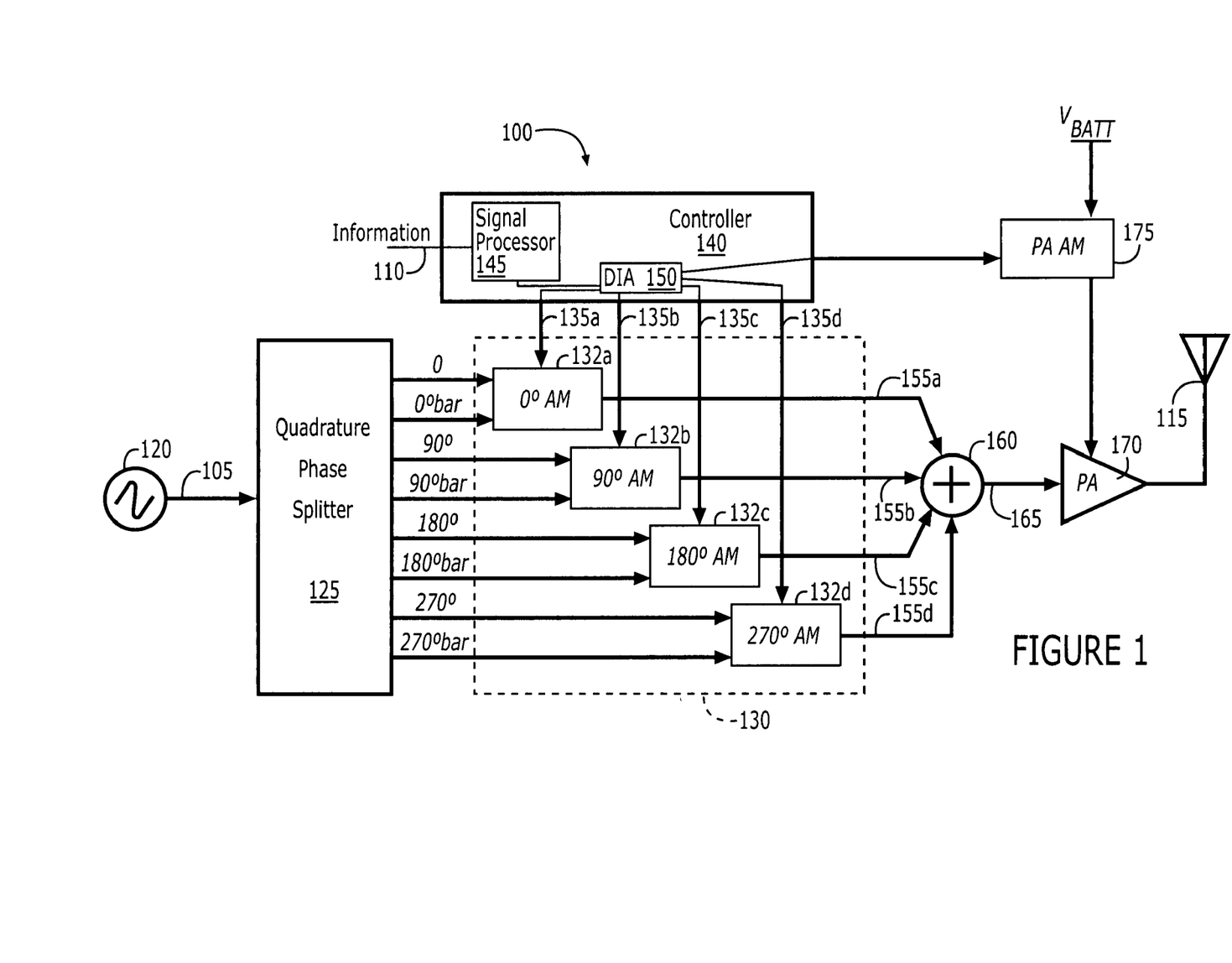
FIG. 1 illustrates a block diagram of a polar modulator according to various embodiments of the present invention.

FIG. 1 shows a block diagram of a polar modulator 100 according to various embodiments of the present invention.

The polar modulator 100 modulates the phase and amplitude of a RF carrier signal 105 based on information 110 that is to be transmitted via an antenna 115.

A voltage controlled oscillator 120, or other signal source, generates the RF carrier signal 105 at a desired carrier frequency. A phase splitter 125 splits the RF carrier signal into four quadrature component signal pairs (i.e., 0°—0° bar, 90°—90° bar, 180°—180° bar, and 270°—270° bar) that are 90° out of phase with each other. The phase splitter 125 may include a divide-by-four counter (e.g., cascaded flip-flops) that divides the RF carrier signal by four to generate the four quadrature component signals. A variable quadrature amplifier 130 separately adjusts the amplitude of each of the four quadrature component signals based on four modulation control signals 135a–d to generate four amplitude adjusted quadrature component signals 155a–d.

Various embodiments of the invention are described herein in which a phase splitter splits a RF carrier signal into 90° quadrants, which may provide a minimum number of components for orthogonality, and which may advantageously use active circuitry quadrature generation based on a division function. However, it is to be understood that these embodiments are provided for illustration purposes only, and that embodiments of the invention include phase splitting into fewer or more phase components (e.g., 60 degrees, 120 degrees, . . . ), which may be selected based on consideration of bandwidth, control line, modulation depth, transceiver interface, and/or other considerations.

A controller 140 generates the four modulation signal 135a–d based on the information 110. The controller 140 may include a digital signal processor 145 and a digital-to-analog converter 150. The digital signal processor 145 may generate digital modulation values based on the information 110, and the digital-to-analog converter 150 may convert the digital modulation values into the four modulation control signals 135a–d. The quadrature amplifier 130 may include four amplifier circuits 132a–d that separately amplify each of the four quadrature component signal pairs based on a different one of the four modulation control signals 135a–d. The controller 140 may operate each of the amplifier circuits 132a–d in a saturated mode, which may increase their efficiency, and/or may generate the modulation control signals 135a–d so that the phase-modulated RF carrier output signal 165 has a modulated phase and a constant amplitude envelope.

A combiner 160 combines the four amplitude adjusted quadrature component signals 155a–d to generate a phase-modulated RF carrier output signal 165. The phase-modulated RF carrier output signal 165 is phase modulated based on the information 110, and may also include none, some, or all of the desired amplitude modulation based on the information 110. A power amplifier 170 amplifies the phase-modulated RF carrier output signal 165 for transmission by the antenna 115.

When the phase-modulated RF carrier output signal 165 includes the phase modulation and all of the amplitude modulation, the power amplifier 170 may be a linear power amplifier and may have a fixed (i.e., non-modulated) power supply, so that the phase-modulated RF carrier output signal 165 is not further modulated before transmission by the antenna 115. Alternatively, at least some amplitude modulation may be made to the phase-modulated RF carrier output signal 165 by modulating the power supply of the power amplifier 170. The controller 140 may generate a power amplifier control signal based on the information 110, and which may be passed through an amplitude modulator 175 to modulate the supply voltage of the power amplifier 170. When the phase-modulated RF carrier output signal 165 includes the phase modulation and at least some of the amplitude modulation, the effect of delay mismatch between the phase modulation and amplitude modulation may be reduced or avoided. When the phase-modulated RF carrier output signal 165 includes the phase modulation and none of the amplitude modulation, the phase-modulated RF carrier output signal 165 is then amplitude modulated by the power amplifier 170.

Figure 2A:
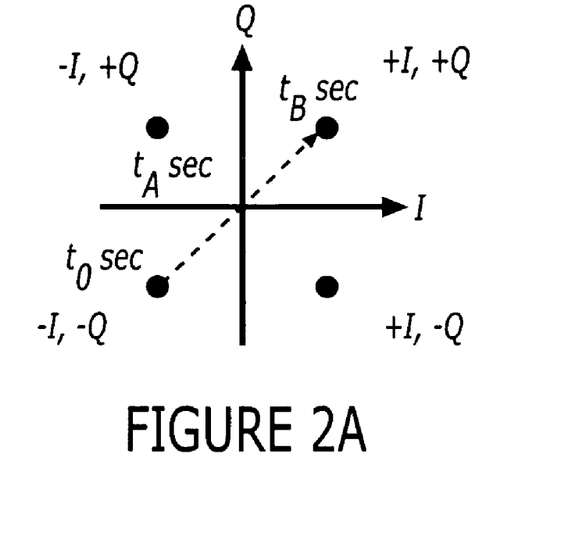
FIGS. 2A–B illustrate a polar diagram and a polar transition diagram according to various embodiments of the present invention.
Figure 2B:
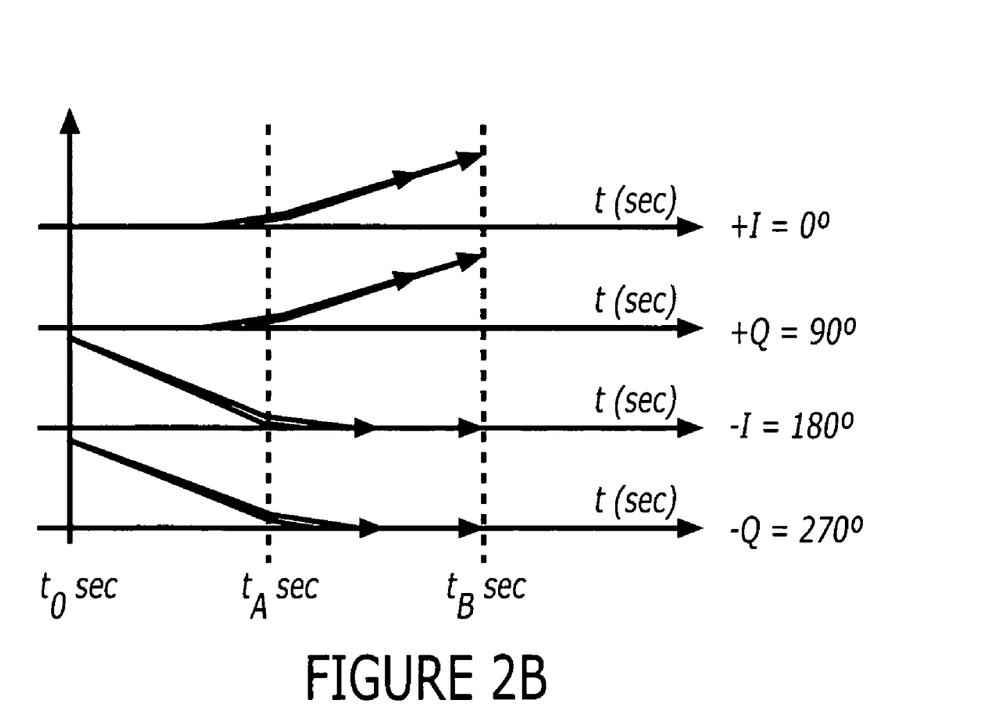

By separately amplifying the four quadrature component signals to form four amplitude adjusted quadrature component signals 155a–d, and then by combining the four amplitude adjusted quadrature component signals 155a–d, the polar components of the phase-modulated RF carrier output signal 165 can be shifted to any desired state based on the four modulation control signals 135a–d, and may be shifted more precisely to, for example, reduce the bandwidth and/or to increase the efficiency of the resulting transmitted signal. For example, FIG. 2A shows a polar diagram in which the polar components (in-phase "I" and quadrature "Q") of the phase-modulated RF carrier output signal 165 at times $t_0$, $t_A$, and $t_B$ are shown. FIG. 2B shows the polar components transitions in the four quadrants for the phase-modulated RF carrier output signal 165 at the times $t_0$, $t_A$, and $t_B$. The controller 140 may be configured to generate the four modulation control signals 135a–d to smooth the resulting polar components transitions of the phase-modulated RF carrier output signal 165, such as near the zero-crossing or, for example, as shown in FIG. 2B at the times $t_0$, $t_A$, and $t_B$. Smooth transitions between polar components may reduce the bandwidth and/or to increase the efficiency of the resulting transmitted signal.

Figure 3:
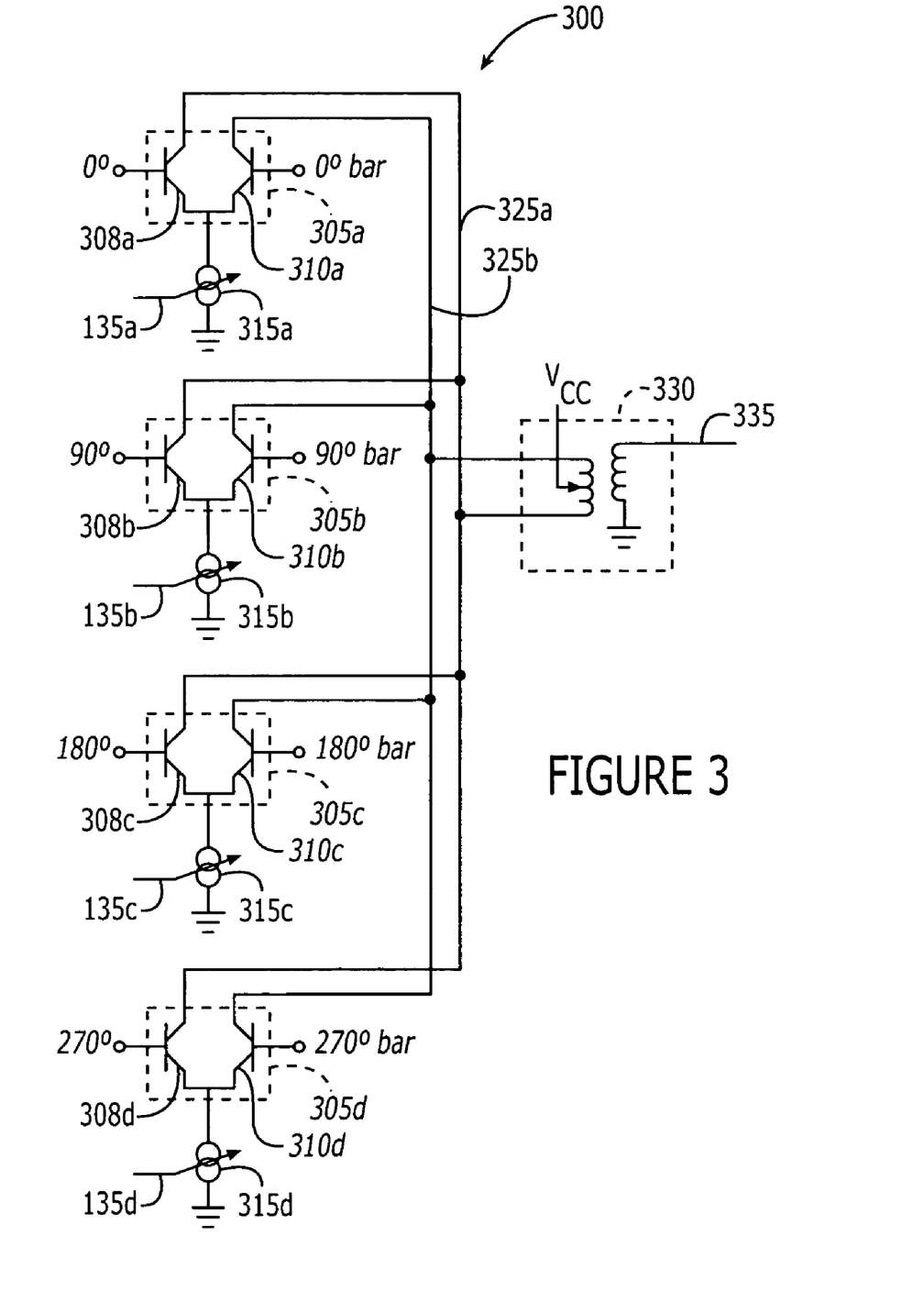
FIG. 3 illustrates a circuit diagram of a quadrature amplifier according to various embodiments of the present invention.

FIG. 3 is a circuit diagram of a variable quadrature amplifier 300 that may be used as the quadrature amplifier 130 that is shown in FIG. 1. The variable quadrature amplifier 300 includes four transistor circuits 305a–d that differentially amplify a different one of the quadrature component signal pairs (i.e., 0°—0° bar, 90°—90° bar, 180°—180° bar, and 270°—270° bar) with a variable amplification based on modulation control signals, which may be the four modulation control signals 135a–d, to generate amplitude adjusted quadrature component signals 320a–d. Each of the transistor circuits 305a–d may include a pair of push-pull configured transistors 308a–d and 310a–d, which are each connected to a different one of four variable current sources 315a–d. The variable current sources 315a–d are each separately controlled by a different one of the four modulation control signals 135a–d to vary the amplification of the quadrature component signal pairs (i.e., 0°—0° bar, 90°—90° bar, 180°—180° bar, and 270°—270° bar), and may be used to adjust tail current of the transistor pairs 308a–d and 310a–d so as to separately maintain the transistor pairs 308a–d and 310a–d in a saturated mode.

For example, the transistor pairs 308a–d and 310a–d may be bipolar junction transistors. An emitter terminal of one of the transistors in each pair and a collector terminal of the other transistor in each pair may be connected to a common node that is connected to a different one of the variable current sources 315a–d. A base of one of the transistors in each pair is connected to a different one of the quadrature component signals in a signal pair (i.e., 0°, 90°, 180°, and 270°), and a base of the other transistor in each pair is connected to a corresponding different one of the inverse quadrature component signals in a signal pair (i.e., 0° bar, 90° bar, 180° bar, and 270° bar).

The amplitude adjusted quadrature component signals 320a–d are combined by conductive lines 325a–b, and may be coupled through an isolation transformer 330, to generate a phase-modulated RF carrier output signal 335, which may be used as the phase-modulated RF carrier output signal 165 shown in FIG. 1.

Figure 4:
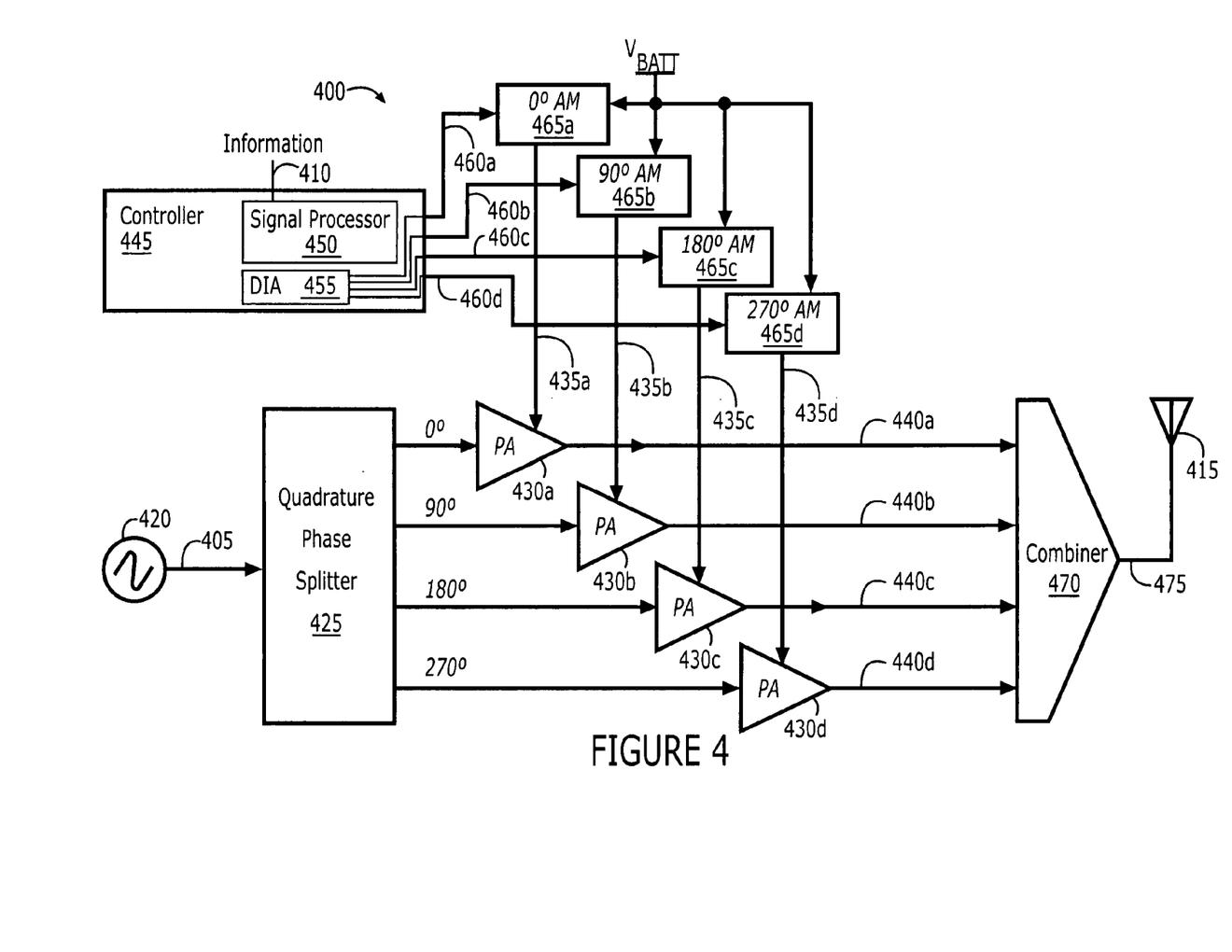
FIG. 4 illustrates a block diagram of a polar modulator according to various embodiments of the present invention.

FIG. 4 is a block diagram of a polar modulator 400 according to some embodiments of the present invention. The polar modulator 400 modulates the phase and amplitude of a RF carrier signal 405 based on information 410 that is to be transmitted via an antenna 415.

A voltage controlled oscillator 420, or other signal source, generates the RF carrier signal 405 at a desired carrier frequency. A phase splitter 425 splits the RF carrier signal into four quadrature component signal pairs (i.e., 0°—0° bar, 90°—90° bar, 180°—180° bar, and 270°—270° bar) that are 90° out of phase with each other. The phase splitter 425 may divide the RF carrier signal by four to generate the four quadrature component signals.

Four power amplifiers 430a–d each amplify a different one of the four quadrature component signals based on a different one of the four modulation control signals 435a–d to generate amplitude adjusted quadrature component signals 440a–d. A controller 445 generates the four modulation signal 435a–d based on the information 410. The controller 445 may include a digital signal processor 450 and a digital-to-analog converter 455. The digital signal processor 450 may generate digital modulation values based on the information 410, and the digital-to-analog converter 150 may convert the digital modulation values to the four analog modulation signals 460a–d. The analog modulation signals 460a–d are separately amplified by amplifiers 465a–d to generate the four modulation control signals 435a–d. A quadrature signal combiner 470 combines the amplitude adjusted quadrature component signals 440a–d to generate a phase and amplitude modulated RF carrier output signal 475 that may be transmitted by the antenna 415. The modulated RF carrier output signal 475 includes both the desired phase modulation and the desired amplitude modulation based on the information 410. Consequently, delay mismatch between the phase modulation and amplitude modulation may be avoided. Further embodiments of the interface to the baseband may include replacing the four separate control signals 460a–d, which control the amplitude of the four quadrant component signals, with a single digital control signal that is multiplexed to control the amplitude information. Multiplexing the control signals may reduce the number of physical control lines that carry signals in the polar modulator. The single control line may then be de-multiplexed and converted to four separate signals at the amplifiers 465a–d. The conversion of the control signal from digital to analog may be performed by, for example, a digital-to-analog converter and/or a passive filter.

Figure 5:
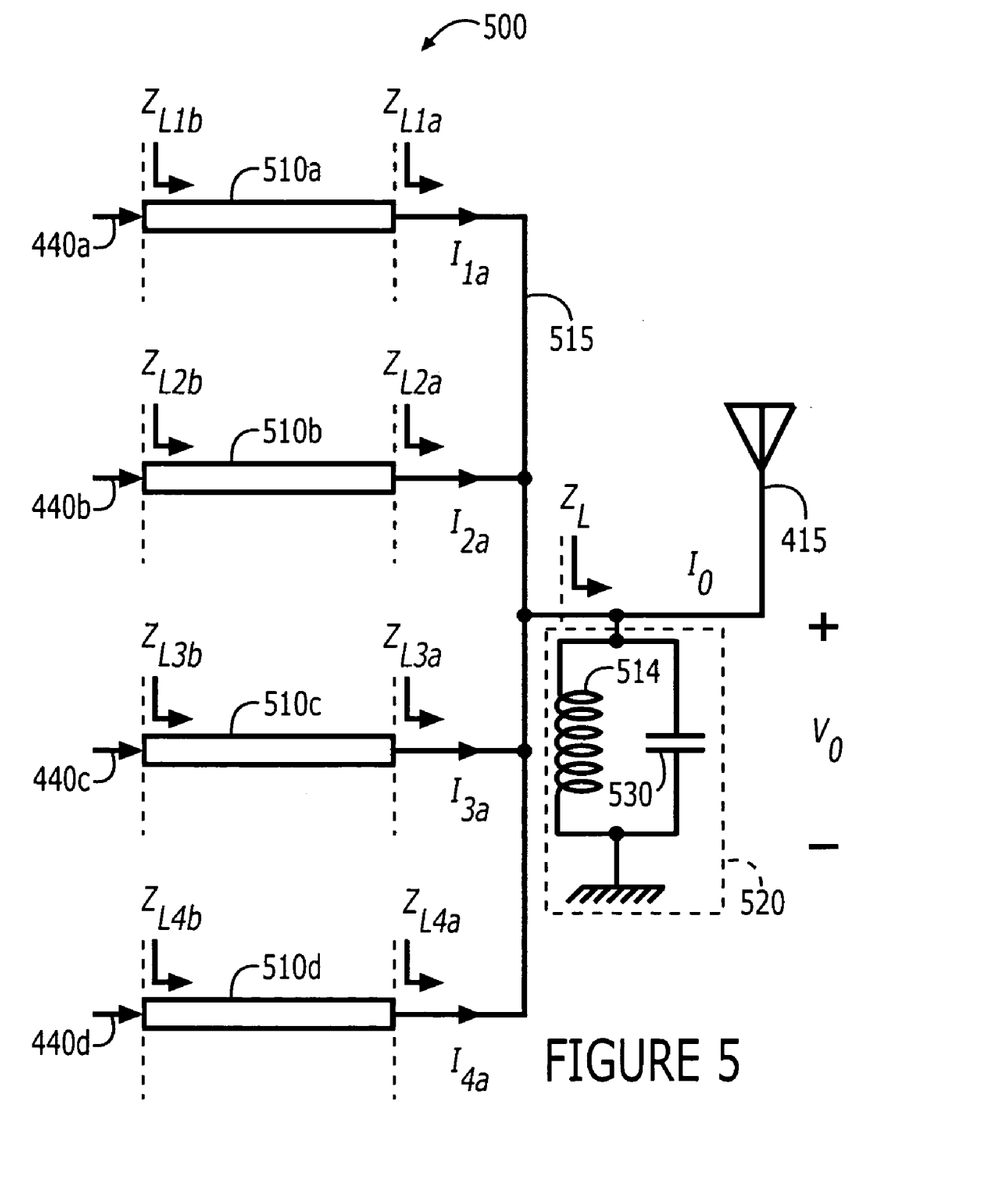
FIG. 5 illustrates a block diagram of a quadrature signal combiner according to various embodiments of the present invention

FIG. 5 shows a quadrature signal combiner 500 that may be used as the combiner 470 shown in FIG. 4 according to some embodiments of the present invention. The quadrature signal combiner 500 passes each the amplitude adjusted quadrature component signals 440a–d a through a different one of four quarter wave transmission lines 510a–d to a common conductor 515, which is coupled to an output load such as the antenna 415. The amplitude adjusted quadrature component signals 440a–d have a constant relative phase and a varying relative amplitude between them. The current of the amplitude adjusted quadrature component signals 440a–d may be relatively scaled to each other by the inverse ratio of the impedances of the corresponding quarter wave transmission lines 510a–d. When the impedances of the corresponding quarter wave transmission lines 510a–d are equal, the current of the amplitude adjusted quadrature component signals 440a–d may also be equal. The quarter wave transmission lines 510a–d may provide isolation between outputs of the power amplifiers 430a–d, and/or may modify the output impedance of the power amplifiers 430a–d to increase their efficiency over a known frequency range. A shunt resonant circuit 520 may be connected to the common conductor 515 and configured to attenuate harmonic currents in the quarter wave transmission lines 510a–d. The shunt resonant circuit 520 may include a parallel inductive load 514 and capacitive load 530.

The polar modulators described herein may be embodied in a wireless terminal, a wireless network (e.g., base station), and/or another wireless communication device. Various embodiments of the polar modulators may be embodied on a single substrate using, for example, a CMOS substrate, and/or may be embodied in a common chip package using, for example, a GaAs HBT with a VCO/phase splitter in BiCMOS. The term "wireless terminal" as used herein may include a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer that includes a radiotelephone transceiver. Wireless terminals may also be referred to as "pervasive computing" devices.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A polar modulator for a RF carrier signal, comprising:
a controller that is configured to generate a plurality of modulation control signals based on information that is to be transmitted, wherein the controller varies the plurality of modulation control signals independently of one another;
a phase splitter that is configured to split the RF carrier signal into quadrature component signals that are 90 degrees out of phase with each other;
a plurality of variable current sources that are each configured to generate a variable amplitude current signal based on a different one of the modulation control signals;
a plurality of transistor circuits that are each configured to amplify a different one of the quadrature component signals with a variable amplification based on the variable amplitude current signal from a different one of the variable current sources to generate an amplitude adjusted quadrature component signal; and
a combiner that is configured to combine the amplitude adjusted quadrature component signals from each of the transistor circuits to generate a phase-modulated RF carrier output signal.

2. The polar modulator of claim 1, wherein:
the controller is configured to generate four modulation control signals based on the information that is to be transmitted;
the plurality of variable current sources comprise four variable current sources that are each configured to generate a variable amplitude current signal based on a different one of the four modulation control signals; and the plurality of transistor circuits comprise four transistor circuits that are each configured to amplify a different one of the quadrature component signals with a variable amplification based on the variable amplitude current signal from a different one of the four variable current sources to generate an amplitude adjusted quadrature component signal.

3. The polar modulator of claim 1, wherein the controller is configured to generate the modulation control signals so that phase-modulated RF carrier output signal from the combiner has a modulated phase and a constant amplitude.

4. The polar modulator of claim 1, wherein the controller is configured to generate the modulation control signals so that phase-modulated RF carrier output signal from the combiner has a modulated phase and a modulated amplitude.

5. The polar modulator of claim 1, wherein the controller is configured to generate the modulation control signals so that the transistor circuits each operate in a saturated mode.

6. The polar modulator of claim 1, wherein:
the transistor circuits each comprise a pair of push-pull configured transistors; and
the controller is configured to adjust a tail current of each of the pair of push-pull configured bipolar junction transistors using one of the modulation control signals.

7. The polar modulator of claim 1, wherein the controller comprises:
a signal processor that is configured to generate a plurality of digital modulation values; and
a digital-to-analog converter that is configured to convert each of the plurality of digital modulation values into analog modulation control signals.

8. The polar modulator of claim 1, further comprising a power amplifier that is configured to amplify the phase-modulated RF carrier output signal for transmission as a wireless RF signal.

9. The polar modulator of claim 8, wherein the power amplifier comprises a linear amplifier.

10. The polar modulator of claim 1, wherein the phase splitter comprises a divide-by-four counter that is configured to generate the quadrature component signals that each have one fourth of the frequency of the RF carrier signal and are 90 degrees out of phase with each other.

11. The polar modulator of claim 10, wherein the divide-by-four counter is configured to generate the quadrature component signals having equal amplitudes.

12. A method of polar modulating a RF carrier signal, comprising:
splitting the RF carrier signal into quadrature component signals that are 90 degrees out of phase with each other;
generating a plurality of modulation control signals based on information that is to be transmitted wherein the plurality of modulation control signals are varied independently of one another;
generating a plurality of variable amplitude current signals that are each based on a different one of the plurality of modulation control signals;
separately adjusting current gain of a plurality of transistor circuits based on a different one of the quadrature component signals and a different one of the plurality of variable amplitude current signals to generate amplitude adjusted quadrature component signals; and
combining the amplitude adjusted quadrature component signals from each of the transistor circuits to generate a phase-modulated RF carrier output signal.

13. The method of claim 12, further comprising:
generating four modulation control signals based on information that is to be transmitted;
generating four variable amplitude current signals that are each based on a different one of the four modulation control signals;
separately adjusting current gain of four transistor circuits based on a different one of the quadrature component signals and a different one of the four variable amplitude current signals to generate four amplitude adjusted quadrature component signals; and
combining the amplitude adjusted quadrature component signals from each of the four transistor circuits to generate a phase-modulated RF carrier output signal.

14. The method of claim 12, further comprising generating the variable amplitude current signals so that the phase-modulated RF carrier output signal has a modulated phase and a constant amplitude.

15. The method of claim 12, further comprising generating the variable amplitude current signals so that the phase-modulated RF carrier output signal has a modulated phase and a modulated amplitude.

16. The method of claim 12, further comprising generating the modulation control signals so that the transistor circuits each operate in a saturated mode.

17. The method of claim 12, further comprising amplifying the phase-modulated RF carrier output signal for transmission as a wireless RF signal.

18. A polar modulator for a RF carrier signal comprising:
a controller that is configured to generate four modulation control signals based on information that is to be transmitted, wherein the controller varies the plurality of modulation control signals independently of one another;
a phase splitter that is configured to split the RF carrier signal into quadrature component signals that are 90 degrees out of phase with each other;
four power amplifiers, each configured to amplify a different one of the quadrature component signals with a variable amplification based on the four modulation control signals to generate an amplitude adjusted quadrature component signal; and
a combiner that is configured to combine the amplitude adjusted quadrature component signals from the four power amplifiers to generate a phase-modulated RF carrier output signal, wherein the combiner comprises four quarter wave transmission lines that are each configured to couple a different one of the amplitude adjusted quadrature component signals to a common output load.

19. The polar modulator of claim 18, further comprising a shunt resonant circuit that is connected to the common output load, and that is configured to attenuate harmonic currents in the quarter wave transmission lines.

20. A method of polar modulating a RF carrier signal, comprising:
splitting the RF carrier signal into quadrature component signals that are 90 degrees out of phase with each other;
generating four modulation control signals based on information that is to be transmitted, wherein the four modulation control signals are varied independently of one another;
separately adjusting the amplitude of each of the quadrature component signals separately based on a different one of the four modulation control signals to generate amplitude adjusted quadrature component signals;

combining the amplitude adjusted quadrature component signals by passing each of the amplitude adjusted quadrature component signals through a different one of four quarter wave transmission lines that are coupled at a common node to generate a phase-modulated RF carrier output signal; and passing the phase-modulated RF carrier output signal to a common output load.

21. The method of claim 20, further comprising attenuating harmonic currents in the quarter wave transmission lines using a shunt resonant circuit that is connected to the common node of the four quarter wave transmission lines.

22. A polar modulator for a RF carrier signal, comprising:

a controller that is configured to generate a plurality of modulation control signals based on information that is to be transmitted, wherein the controller varies the plurality of modulation control signals independently of one another;

a phase splitter that is configured to split the RF carrier signal into phase component signals that are out of phase with each other;

a plurality of variable current sources that are each configured to generate a variable amplitude current signal based on a different one of the modulation control signals;

a plurality of transistor circuits that are each configured to amplify a different one of the phase component signals with a variable amplification based on the variable amplitude current signal from a different one of the variable current sources to generate an amplitude adjusted phase component signal; and a combiner that is configured to combine the amplitude adjusted phase component signals from each of the transistor circuits to generate a phase-modulated RF carrier output signal.

* * * * *